(12) United States Patent
Li et al.

(10) Patent No.: US 7,182,263 B2
(45) Date of Patent: Feb. 27, 2007

(54) MONITORING LIGHT BEAM POSITION IN ELECTRO-OPTICAL READERS AND IMAGE PROJECTORS

(75) Inventors: Yajun Li, Oakdale, NY (US); Paul Dvorkis, East Setauket, NY (US); Dmitriy Yavid, Stony Brook, NY (US); Frederick F. Wood, Medford, NY (US); Miklos Stern, Woodmere, NY (US); Edward Barkan, Miller Place, NY (US); Narayan Nambudri, Kings Park, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 131 days.

(21) Appl. No.: 10/956,693

(22) Filed: Sep. 30, 2004

(65) Prior Publication Data

US 2006/0065735 A1 Mar. 30, 2006

(51) Int. Cl.
*G06K 7/10* (2006.01)
(52) U.S. Cl. .................... 235/462.36; 235/462.08; 235/462.2; 235/472.01

(58) Field of Classification Search ........... 235/462.08, 235/462.17, 462.2, 462.21, 462.23, 462.36
See application file for complete search history.

(56) References Cited

U.S. PATENT DOCUMENTS

| 5,504,319 A | * | 4/1996 | Li et al. ............... 235/462.08 |
| 5,510,607 A | * | 4/1996 | Ishikawa ............... 235/462.2 |
| 5,837,987 A | * | 11/1998 | Koenck et al. ......... 235/462.27 |
| 5,889,269 A | * | 3/1999 | Bridgelall et al. ...... 235/462.32 |
| 7,007,848 B2 | * | 3/2006 | Li ....................... 235/462.21 |

* cited by examiner

Primary Examiner—Seung Ho Lee
(74) Attorney, Agent, or Firm—Kirschstein, et al.

(57) ABSTRACT

An arrangement for determining light beam position in an electro-optical reader, image projector and like devices includes a drive for moving a scanning light beam at a scan frequency across a target as a scan line, and an electro-optical feedback assembly operatively connected to the drive, for optically detecting scan line position during beam movement, and for generating a feedback signal at the scan frequency, the feedback signal being indicative of the scan line position. A feedback coil in the drive is eliminated to avoid electromagnetic coupling between multiple coils in the drive.

16 Claims, 6 Drawing Sheets

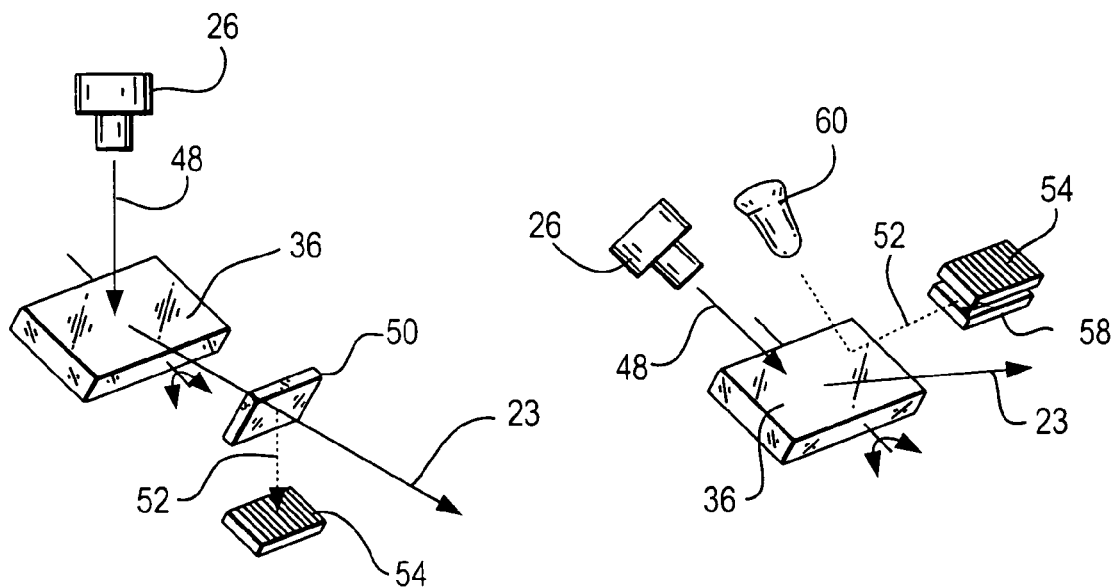
FIG. 3
FIG. 5
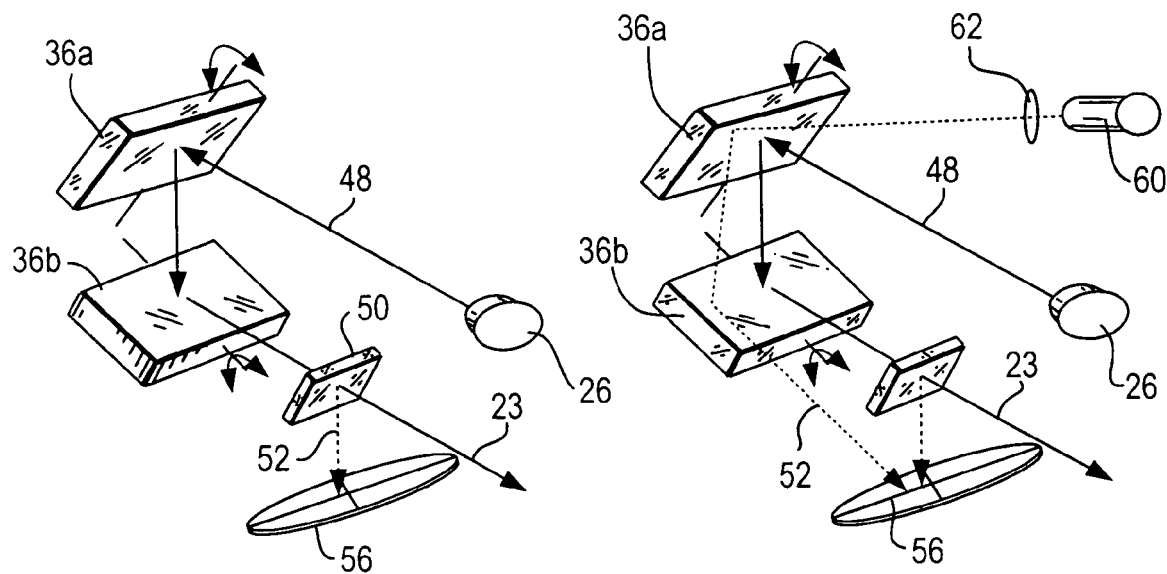
FIG. 4
FIG. 6

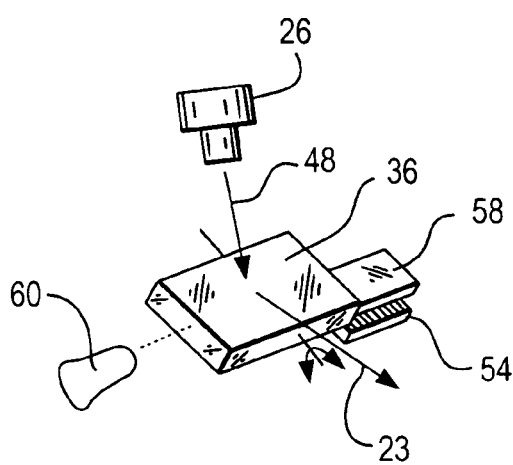
FIG. 7
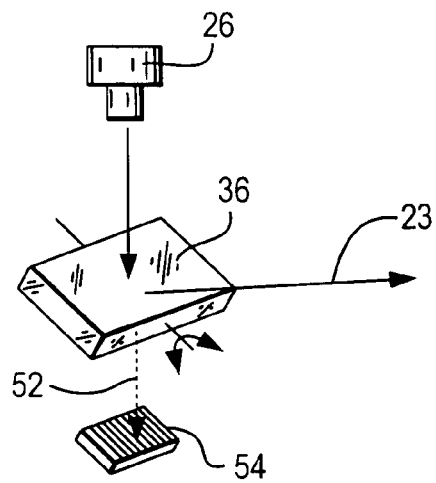
FIG. 9
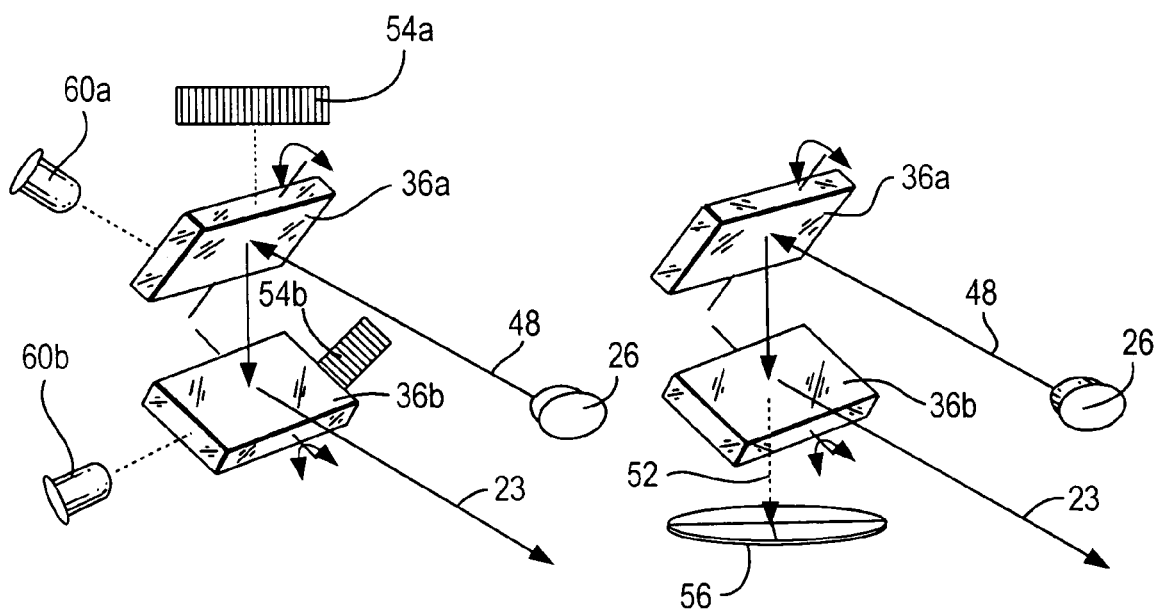
FIG. 8
FIG. 10

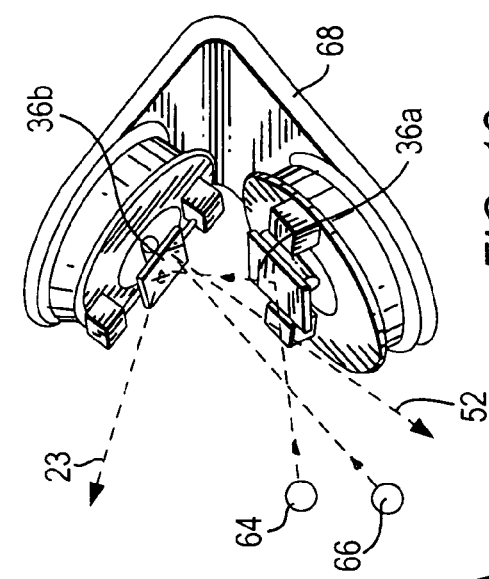
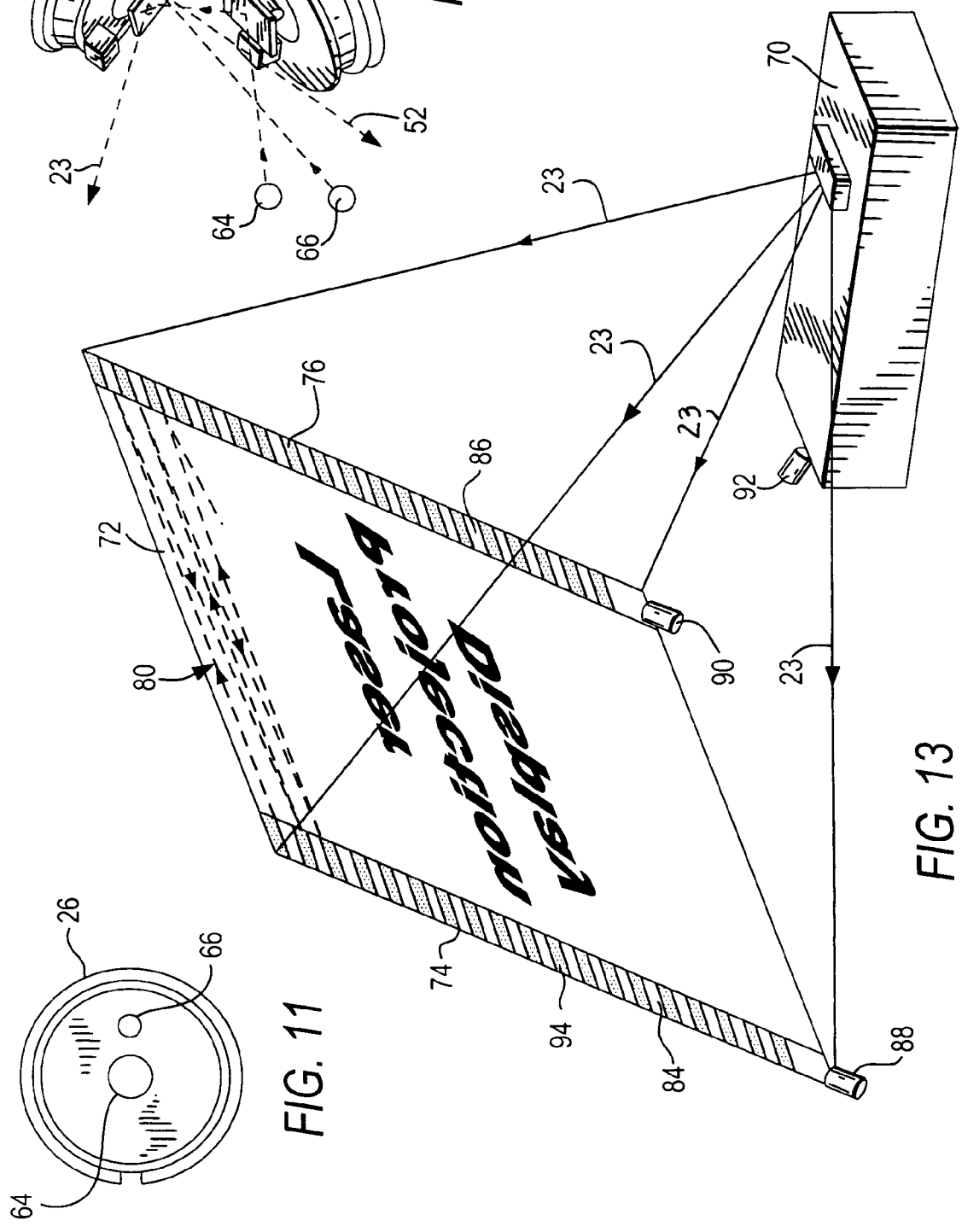
FIG. 11
FIG. 12
FIG. 13

FIG. 14
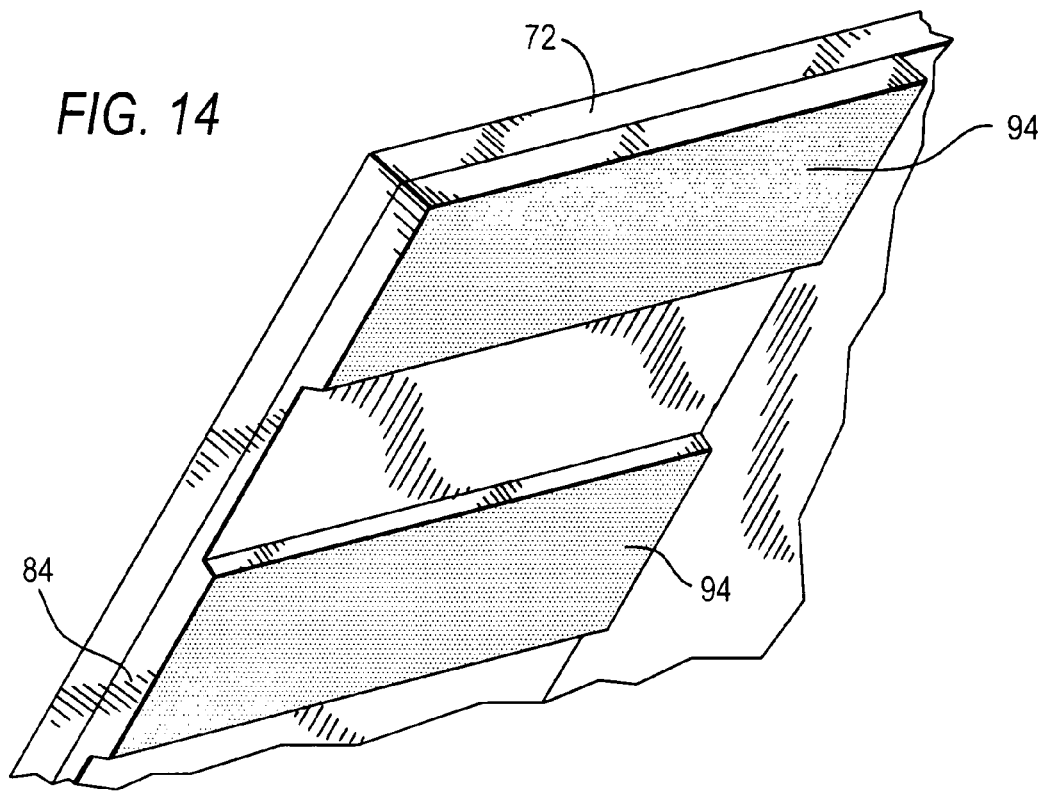
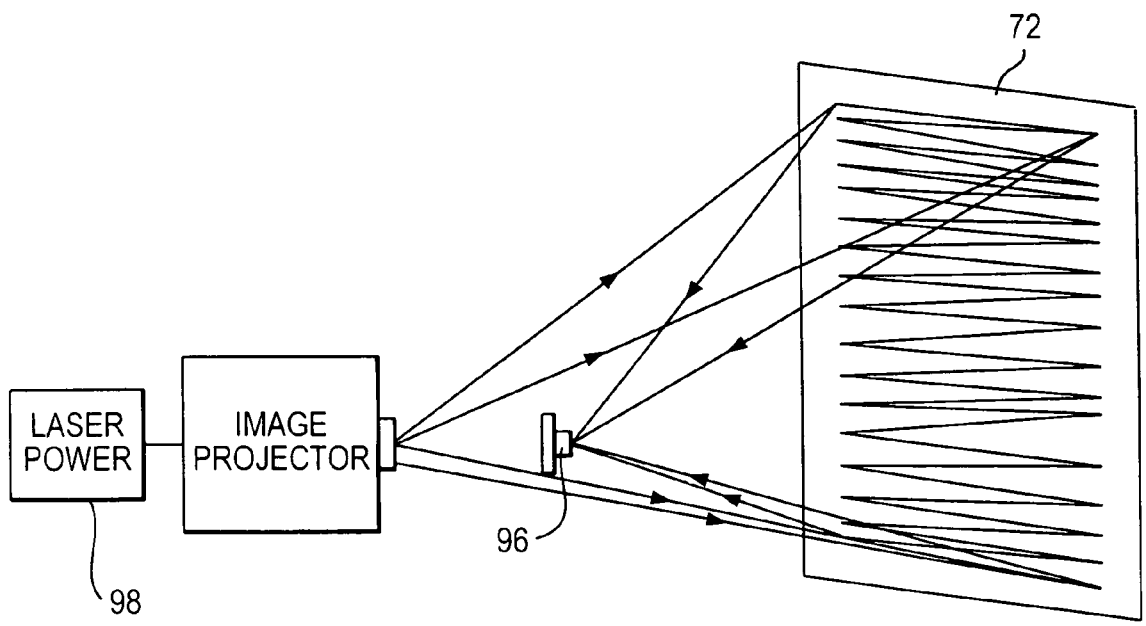
FIG. 15

MONITORING LIGHT BEAM POSITION IN ELECTRO-OPTICAL READERS AND IMAGE PROJECTORS

BACKGROUND OF THE INVENTION

1. Field of the Invention

The present invention generally relates to monitoring light beam position of scanning light beams employed in electro-optical readers for reading indicia such as bar code symbols, or in image projectors for displaying images and, more particularly, to employing optical feedback to determine beam position.

2. Description of the Related Art

Electro-optical readers are well known in the art for electro-optically transforming a spatial pattern of graphic indicia, known as a symbol, into a time-varying electrical signal which is then decoded into data. Typically, a light beam generated from a light source is focused by a lens along an optical path toward a target that includes the symbol. The light beam is repetitively swept along a scan line or a series of scan lines arranged in a raster pattern over the symbol by moving a scan mirror or some other optical component located in the optical path, or by moving the light source itself. A photodetector detects light scattered or reflected from the symbol and generates an analog electrical signal. Electronic circuitry converts the analog signal into a digitized signal having pulse widths corresponding to physical widths of bars and spaces comprising the symbol, and a decoder decodes the digitized signal into data descriptive of the symbol.

The repetitive sweeping of the light beam is performed by a drive, typically a motor having a rotor oscillatable about an axis. A permanent magnet and the scan mirror are jointly oscillatable with the rotor. The motor is driven by a drive coil wound on a bobbin that is located physically close to the permanent magnet. A secondary or feedback coil is also wound on the same bobbin. When the rotor is moving, the movement of the magnet generates an alternating voltage drive signal in the drive coil. The frequency of the generated drive signal in the drive coil is the same as the rotor motion, with one cycle of the drive signal corresponding to one cycle of rotor motion. The amplitude of the drive signal in the drive coil is proportional to the velocity of the rotor motion. The polarity of the drive signal in the drive coil is dependent on the direction of rotor motion such that a positive half cycle of the drive signal indicates that the rotor is moving in one drive direction, and a negative half cycle indicates that the rotor is moving in the opposite drive direction. Zero crossings of the drive signal occur when the rotor reaches its maximum travel at each end of a respective scan line. At each zero crossing, the rotor stops for an instant and reverses drive direction.

The feedback coil is useful for a variety of purposes. It also generates an alternating voltage signal, known as a feedback signal, due to the movement of the magnet. The frequency and polarity of the feedback signal generated in the feedback coil corresponds to the frequency and polarity of the drive signal. An electrical drive monitoring circuit is often employed to monitor the amplitude of the feedback signal and, for example, turn the light source off if the amplitude falls below a predetermined threshold, thereby indicating that the drive is malfunctioning. An electrical closed loop control circuit is also often employed to process the feedback signal to make decisions about how to continue driving the motor. Still another electronic circuit that is often employed processes the zero crossings of the feedback signal to derive a start-of-scan (SOS) signal that represents rotor motion and is used to synchronize the scan lines.

Although generally satisfactory for its intended purpose, the use of the feedback coil for monitoring for drive failure, for driving the drive, and for generating the SOS signal causes problems. There is undesirable magnetic coupling between the drive and feedback coils. To remove such unwanted coupled signals and the resulting noise and distortion, electronics must be added to actively cancel the coupled signals, and filtering is necessary to ensure control loop stability. Since filtering introduces phase delays, the SOS signal will never represent the true position of a beam spot of the scanning light beam relative to the leading bars and spaces in a target symbol. This problem is solved in the art by adding and adjusting electronics to advance or delay the SOS signal depending on the type of motor used. In addition, when the feedback coil is coupled to the drive coil, an annoying buzzing sound is sometimes generated.

Another arrangement, other than a symbol reader, that repetitively scans a light beam in a raster pattern over a target is an image projector for projecting an image on a display surface, for example, a screen. Typically, one or more energizable lasers of different wavelengths project respective laser beams toward the screen, while an oscillating drive sweeps the beams in scan lines over the screen. The lasers are energized and deenergized during each sweep to create a bit-mapped image on the screen for viewing. As in the case of readers, the drive includes a motor having feedback and drive coils, as described above, with their attendant problems of cross-coupled signals, extra hardware, phase delays and annoying sounds.

SUMMARY OF THE INVENTION

Objects of the Invention

Accordingly, it is a general object of this invention to eliminate electromagnetic feedback in light scanning arrangements, such as electro-optical readers and image projectors.

More particularly, it is an object of the present invention to determine light beam position by an optical, rather than an electromagnetic, arrangement.

Still another object of the present invention is to enable drive failure to be monitored, to ensure control loop stability, to generate SOS signals without phase delays, and to eliminate annoying sounds in such light scanning arrangements without employing a feedback coil.

FEATURES OF THE INVENTION

In keeping with the above objects and others which will become apparent hereinafter, one feature of the present invention resides, briefly stated, in an arrangement for, and a method of, determining light beam position by employing a drive for moving a scanning light beam at a scan frequency across a target as a scan line, and by employing electro-optical feedback means operatively connected to the drive for optically detecting scan line position and for generating a feedback signal at said scan frequency, the feedback signal being indicative of the scan line position.

The arrangement may be an electro-optical reader in which case the target is a symbol, preferably a one- or two-dimensional symbol. The arrangement could also be an image projector in which case the target is a screen on which an image is viewable. In either case, the scanning light beam is moved by a drive, for example, a uni- or bi-directional, electrical motor having a rotor on which a light emitting component is mounted for joint oscillating movement. The light emitting component can be a light source, such as a laser diode, or an optical component in the path of the light beam. Preferably, the component is a scan mirror mounted on the rotor and operative for reflecting the scanning light beam therefrom. The motor includes a permanent magnet and a drive coil operative for oscillating the reflector in opposite drive directions to generate a raster pattern of scan lines which extend in mutually orthogonal scan directions over the target. In the case of the reader, a portion of the light derived from the scan lines and scattered by the symbol is processed to read the symbol. In the case of the projector, the light source is energized and deenergized during travel of the beam along each scan line to create the image on the target screen.

In accordance with this invention, no feedback or secondary coil is wound in the motor. The above-described uses of the feedback coil, namely for monitoring for motor failure, for driving the motor, for generating SOS signals, and so on, are performed by reliance on electro-optical feedback arrangements, and not by electromagnetic feedback arrangements. For example, one such electro-optical feedback arrangement utilizes a beam splitter for optically splitting the scanning light beam to form a feedback beam, and a position sensitive drive for detecting the position of the feedback beam. Another arrangement utilizes a plurality of light sources for respectively generating the scanning and feedback beams.

By employing optical feedback, maximum coupling efficiency between the drive coil and the motor magnet can be realized without consideration of a secondary feedback coil. Cancellation circuitry for cross-coupled signals is unnecessary. Minimal filtering may still be needed for loop control and bandwidth limiting. Accuracy of the motor failure signal is improved. An SOS signal derived from optical feedback has no phase delays. Motor startup time no longer has to be delayed by consideration of transformer feedthrough to the feedback coil. There is no annoying sounds related to transformer coupling between coils.

In brief, a magnetic feedback signal is not the best representation of motor position and velocity and, hence, of beam position. The magnetic feedback signal of the prior art becomes corrupted due to signal feedthrough between the drive and feedback coils. An optical feedback signal is not so corrupted and enhances performance.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a first embodiment of an electro-optical feedback arrangement in accordance with this invention;

FIG. 4 is a second embodiment of an electro-optical feedback arrangement in accordance with this invention;

FIG. 5 is a third embodiment of an electro-optical feedback arrangement in accordance with this invention;

FIG. 6 is a fourth embodiment of an electro-optical feedback arrangement in accordance with this invention;

FIG. 7 is a fifth embodiment of an electro-optical feedback arrangement in accordance with this invention;

FIG. 8 is a sixth embodiment of an electro-optical feedback arrangement in accordance with this invention;

FIG. 9 is a seventh embodiment of an electro-optical feedback arrangement in accordance with this invention;

FIG. 10 is a eighth embodiment of an electro-optical feedback arrangement in accordance with this invention;

FIG. 11 is a front elevational view of a dual aperture laser diode for use in an electro-optical feedback arrangement in accordance with this invention;

FIG. 12 is a perspective view of an electro-optical feedback arrangement depicting the optical folded paths of scanning and feedback beams in accordance with this invention;

FIG. 13 is a perspective view depicting multiple embodiments of a rear projector arrangement in accordance with this invention;

FIG. 14 is a broken-away, enlarged detail of FIG. 13;

FIG. 15 is a perspective view of still another embodiment in accordance with this invention;

DETAILED DESCRIPTION OF THE PREFERRED EMBODIMENTS

Figure 1:
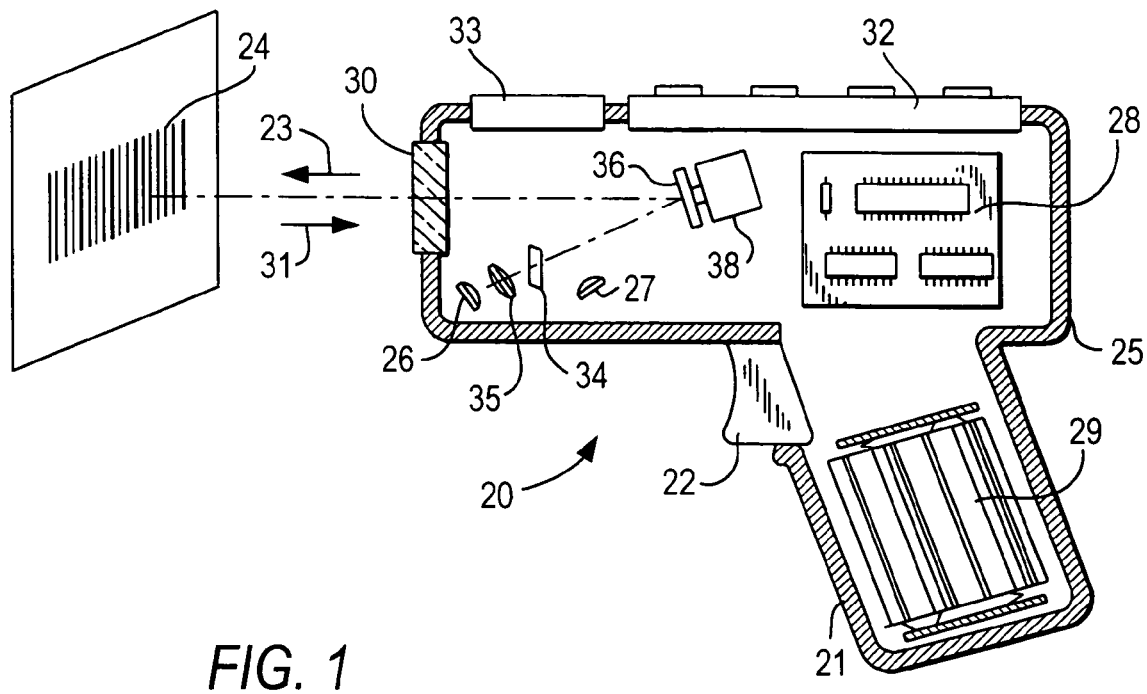
FIG. 1 is a schematic diagram of a hand-held reader for reading a bar code symbol in accordance with the prior art.

Reference numeral 20 in FIG. 1 generally identifies a prior art hand-held reader for electro-optically reading indicia, such as bar code symbol 24, located in a range of working distances therefrom. The reader 20 has a pistol grip handle 21 and a manually actuatable trigger 22 which, when depressed, enables a light beam 23 to be directed at the symbol 24. The reader 20 includes a housing 25 in which a light source 26, a light detector 27, signal processing circuitry 28, and a battery pack 29 are accommodated. A light-transmissive window 30 at a front of the housing enables the light beam 23 to exit the housing, and allows light 31 scattered off the symbol to enter the housing. A keyboard 32 and a display 33 may advantageously be provided on a top wall of the housing for ready access thereto.

In use, an operator holding the handle 21 aims the housing at the symbol and depresses the trigger. The light source 26 emits a light beam which is optically modified and focused by an optical focusing assembly 35 to form a beam spot on the symbol 24. The beam passes through a beam splitter 34 to a scan mirror 36 which is repetitively oscillated at a scan rate of at least 20 scans a second by a motor drive 38. The scan mirror 36 reflects the beam incident thereon to the symbol 24 and sweeps the beam spot in scans across the symbol in a scan pattern. The scan pattern can be a scan line extending lengthwise along the symbol along a scan direction, or a series of scan lines arranged along mutually orthogonal directions, or an omnidirectional pattern, just to name a few possibilities.

The reflected light 31 has a variable intensity over the scan pattern and passes through the window 30 onto the scan mirror 36 where it is reflected onto the splitter 34 and, in turn, reflected to the photodetector 27 for conversion to an analog electrical signal. The signal processing circuitry 28 digitizes and decodes the signal to extract the data encoded in the symbol.

Figure 2:
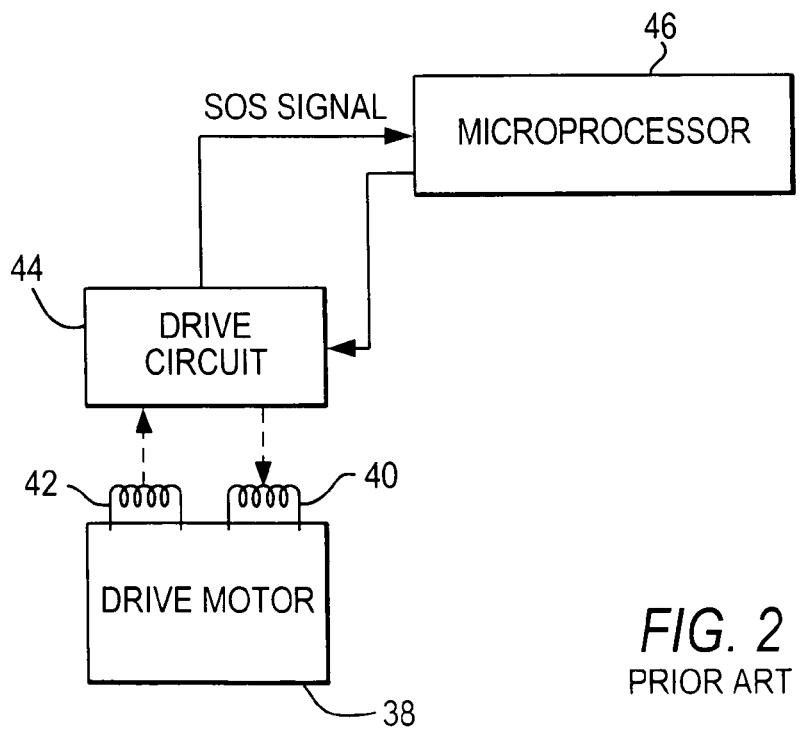
FIG. 2 is a block diagram of a detail of FIG. 1 in accordance with the prior art.

The drive motor 38 is shown in more detail in FIG. 2 with a drive coil 40 and a feedback coil 42 both wound on a common bobbin. The signal processing circuitry 28 includes a control microprocessor 46 operative for sending a control signal to a drive circuit 44 which, in turn, sends a drive signal to the drive coil 40 to generate an electromagnetic field that interacts with a permanent magnet (not illustrated) and drives the motor 38.

As explained above, and as known in the prior art, the feedback coil 42 also interacts with the magnet and generates an electrical feedback signal of the same frequency as the drive signal and is useful for a variety of purposes. For example, the drive circuit 44 includes an error comparator in a closed loop circuit for adjusting the amplitude of the drive signal fed to the drive coil. Also, the feedback signal is used to derive the SOS signal described above, which is fed to the microprocessor for synchronization of the scan lines. In addition, the feedback signal is used to monitor for drive failure.

In accordance with one feature of this invention, it is proposed to eliminate the electromagnetic coupling between the coils 40, 42 and the resulting noise and signal distortion, extra hardware requirement for noise cancellation, filtering and phase adjustment, phase delays, and annoying sounds, all as described above. This is accomplished by eliminating the feedback coil and instead using electro-optical feedback to perform the functions previously accomplished by the feedback coil.

As shown in FIG. 3 for a first embodiment of an electro-optical feedback arrangement, the light source 26, preferably a laser diode, emits a main beam 48 to the scan mirror 36 oscillatable by the drive motor 38 in the drive directions of the double-headed arrow. The beam reflected off the scan mirror 36 is optically split by a beam splitter 50 to form the scanning beam 23 and a feedback beam 52. The scanning beam 23, as shown in FIG. 1, is directed to the symbol 24. The feedback beam 52 is directed to a one-dimensional position sensitive device (PSD) 54 for optically detecting the position of the feedback beam and, in turn, the scanning beam.

The PSD 54 is a linear array of photodiodes and a preferred device is manufactured by Hamamatsu Photonic Devices of Japan and available as Model No. S3932 or S1300. The PSD collects incident light at various angles of incidence and produces two electrical signals at its dual channel outputs. These signals are processed to determine the position and range of the incident light.

FIG. 4 is analogous to FIG. 3, except that this embodiment is applicable to two-dimensional scanning. The main beam 48 from the light source 26 is successively reflected off two scan mirrors 36a, 36b whose axes of rotation are mutually orthogonal. The beam reflected off the mirror 36b is optically split by the splitter 50 to form the scanning beam 23 and the feedback beam 52. The feedback beam 52 is directed to a two-dimensional PSD 56, which is analogous to the PSD 54, except that the PSD 56 includes an array of photodiodes arranged along mutually orthogonal rows and columns.

FIG. 5 depicts another embodiment analogous to FIG. 3, in which the feedback beam 52 is not formed by being split from a main beam 48, but instead is separately formed from another light source 60, in this case, a light emitting diode (LED). The LED 60 directs its beam to the scan mirror 36 whose reflection forms the feedback beam 52 which passes through a lens 58 en route to the PSD 54 for optical detection. The scanning and feedback beams have the same frequency as the rate of oscillation of the mirror 36. The LED light preferably matches the sensitivity of the PSD, and typically infrared light is used.

FIG. 6 is analogous to FIG. 5, except that this embodiment is applicable to two-dimensional scanning. Just as the main beam 48 from the source 26 is successively reflected off the two scan mirrors 36a, 36b to form the scanning beam 23, the light from the LED 60, after passing through a lens 62, is successively reflected off the same two scan mirrors 36a, 36b to form the feedback beam 52 which is optically detected by the PSD 56.

FIG. 7 is analogous to FIG. 5, except that the LED 60 directs its light at a rear reflective surface of the mirror 36 for reflection therefrom to the PSD 54. FIG. 8 is analogous to FIG. 7, except for being applicable to two-dimensional scanning. In FIG. 8, the main beam 48 from the source 26 is successively reflected off the two scan mirrors 36a, 36b to form the scanning beam 23. Now, there are two LEDs 60a, 60b and two one-dimensional PSDs 54a, 54b. The light from LEDs 60a, 60b is respectively directed to rear reflective surfaces of the mirrors 36a, 36b to form a pair of feedback beams that are optically detected by the PSDs 54a, 54b.

FIG. 9 depicts an embodiment analogous to FIG. 5, except that the beam splitting function is incorporated directly into the scan mirror 36. The mirror 36 is partly reflective to produce the scanning beam 23 and is partly transmissive to enable the feedback beam 52 to impinge on the PSD 54.

FIG. 10 is analogous to FIG. 9, except it is applicable for two-dimensional scanning. The main beam 48 from source 26 successively reflects off scan mirrors 36a, 36b to form the scanning beam 23. The mirror 36b is also designed to be light-transmissive, as discussed for FIG. 9, in which case, the light passing through the mirror 36b forms the feedback beam 52 which is optically detected by PSD 56.

FIG. 11 is an elevational view of the light source 26, especially a laser diode having twin apertures 64, 66. The scanning beam 23 is emitted from aperture 64, and the feedback beam 52 is emitted from aperture 66. Hence, separate LEDs or other discrete light sources are not needed.

FIG. 12 is a perspective view of the mirrors 36a, 36b mounted on a frame 68 for placement in the reader of FIG. 1 and depicts the optical path of the scanning beam 23 which originated from aperture 64, as well as the optical path of the feedback beam 52 which originated from aperture 66. Apertured diodes eliminate the need for beam splitters and/or separate light sources.

Optical feedback eliminates the feedback coil and its associated problems. Maximum coupling efficiency between the motor magnet and the drive coil can now be realized. Noise cancellation circuitry is unnecessary. The SOS signal has no phase delays. Any small oscillations of the feedback beam under a fixed threshold serves as a motor failure indicator.

As mentioned above, each of the above electro-optical feedback embodiments could be used in other scanning arrangements, for example, an image projector of the type exemplified in U.S. Pat. No. 6,655,597. As shown in FIG. 13, an image projector housing 70 contains one or more of the above drives each operative for oscillating a scan mirror to create a raster pattern 80 of scan lines over a display surface, such as rear projection screen 72 having frame portions 74, 76 spaced apart along a horizontal scan direction, each frame portion 74, 76 extending lengthwise along a vertical scan direction. The frame portions 74, 76 overlie the ends of each scan line. The light source for generating the scanning beam is energized or deenergized at locations along each scan line to create a bit-mapped image comprised of illuminated and non-illuminated pixels on the screen 72.

Another feature of this invention resides in placing a pair of light pipes 84, 86 within the frame portions 74, 76, and a pair of photodiodes 88, 90 at the ends of the pipes 84, 86. Each pipe is essentially a transparent solid piece of synthetic plastic material for conveying light. When the ends of each scan line strike the pipes, the received light will be transmitted to, and detected by, the photodiodes 88, 90 which, in turn, generate an electrical signal that can be used as the SOS signal. This SOS signal is optically, not magnetically, derived and, hence, is not subject to the electromagnetic coupling problems described above. This electrical signal can also be used to detect motor failure. Instead of the two photodiodes 88, 90, a single photodetector 92 is centrally located to look for light reflected from both frame portions 74, 76.

As more clearly seen in the broken-away view of FIG. 14 in which the upper left corner of the screen 72 is shown in enlargement, a plurality of spaced-apart opaque stripes 94 is successively arranged lengthwise along each frame portion. When a scan line end is incident on an opaque stripe, the lack of a signal being detected by photodiode 88 (or the presence of a signal detected by photodiode 92), is detected, and this provides information on the vertical position of the scanning beam. This is used to linearize the raster pattern over the vertical scan direction and is also useful for detecting failure of the motor responsible for the vertical scan. This is also used to accurately align left and right going scans to converge the projected image. In a variant, a center one of the opaque stripes is omitted in order to indicate the center of the screen along the vertical direction.

Since the projected image employs laser illumination, the arrangement needs to meet FDA regulations (CDH and/or IEC). A proposed approach is to include a photodetector for sensing reflected illumination from the screen 72.

For a built-in screen, the reflected illumination can be calibrated at manufacture. If there is a change in the reflected power, it indicates that either the screen has been removed or an object has entered between the projector and the screen. In either case, the laser can be either shut down, or the laser power can be reduced to much lower levels. The reduced power arrangement can still be used to display directions to the user, directing him to restore the screen in order to regain full power operation. For instance, a message stating "Please aim your display at a uniform background for proper operation!" can be projected.

If the arrangement is used in free projection mode, as shown in FIG. 15, then the image can be projected on any surface. At start-up, the display uses low power laser output to scan the surface. Full power operation only turns on, if completely uniform reflection is detected, indicating the presence of a screen, wall, etc. Again, if the background sensed is not uniform, then the display can direct the user to aim the arrangement at a safe background before it can be turned to full power.

Hence, still another aspect of this invention is embodied in determining whether the screen 72 is present or not and, in response, modifying the supply of electrical energy to the light source 26. A photodiode 96 having a field of view approximately equal to the field of view of the image projector is operative for monitoring the laser light reflected back from the screen 72. The reflectivity of the screen should be uniform across its entire surface so that the photodiode 96 will see a constant fraction of the reflected light. However, if the screen 72 is not present, or if it is torn, the photodiode 96 would detect considerable variations in reflectivity. This information is used to adjust the electrical energy supply 98 to the laser source. If no screen is detected, then the light source is deenergized, preferably within 20 nanoseconds to insure meeting safety regulations. If the screen is detected, then the energy supply 98 can be increased to obtain a brighter display.

To assess the reflectivity of a given point on the screen, not only is the reflected light measured, but also the ratio of reflected/emitted light is calculated. This might be difficult to do in real time. Also, at some points, the laser source might be completely deenergized, and no information about screen reflectivity at those points can be collected. A possible solution is to add an additional infrared (invisible) low power laser operating continuously for detecting the background, and to have the spectral response of the photodiode 96 matched to this infrared laser.

For increased sensitivity, the field of view of the photodiode 96 should be scanned together with the scanning beam as in retro-reflective readers. Instead of a photodiode with adequate temporal resolution, an array of photosensors (e.g., a charge coupled device or a complementary metal oxide semiconductor device) can be used. These devices have the same goal of assessing screen reflectivity at every point. Again, a dedicated infrared illuminator, such as a laser or a flood-illumination LED can be used. An array of passive far-infrared sensors can also be used. These sensors are sensitive to the radiation of the human body and are widely used in security systems. If the combined field of view of the array covers the entire field of view of the image projector, then the presence of any part of a human body in the field of view can be detected, even at significant distances. If a human body is detected, then the electrical energy to the laser diode is shut off for safety purposes.

Figure 16:
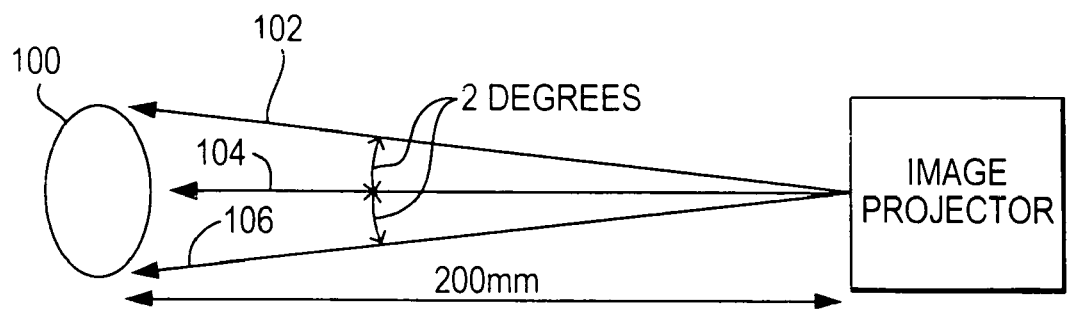
FIG. 16 is a schematic view of a safety regulation procedure.

Another approach to meet CDRH requirements is depicted in FIG. 16. Safety regulations measure the energy received through an aperture 100 of a seven mm diameter at 200 mm distance. If three color laser beams 102, 104, 106 were misaligned by 2° with respect to each other, then the three beams never pass through the aperture 100 concurrently, allowing a higher total output power for the same CDRH classification. The image can be still correctly displayed by adjusting for the angular misalignment via electronic delay. This scheme can be further exploited by using two or more lasers for the same color, misaligned by two degrees with respect to each other, in order to meet safety requirements.

Yet another approach to increase the display brightness without exceeding CDRH limits is to divide the screen area into halves, quadrants, etc., with a different image projector displaying on the various subsections of the screen.

Figure 17:
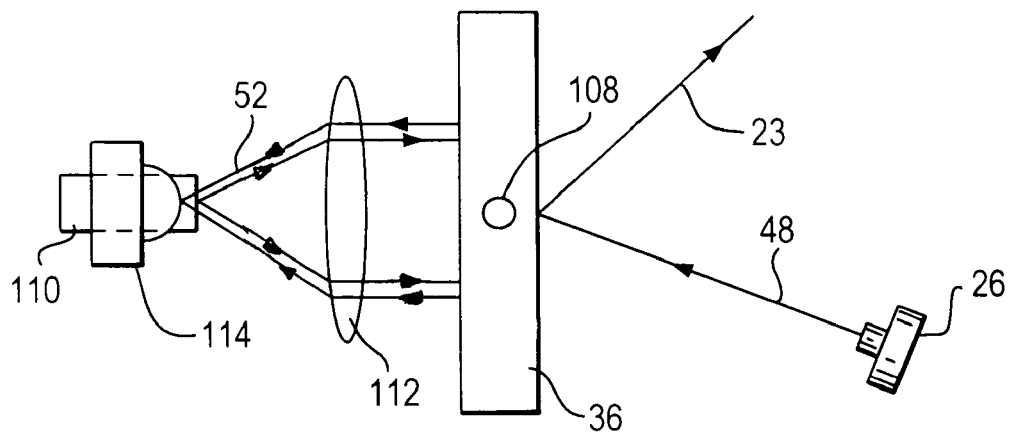
FIG. 17 is a top plan view of a ninth embodiment of an electro-optical feedback arrangement in accordance with this invention.
Figure 18:
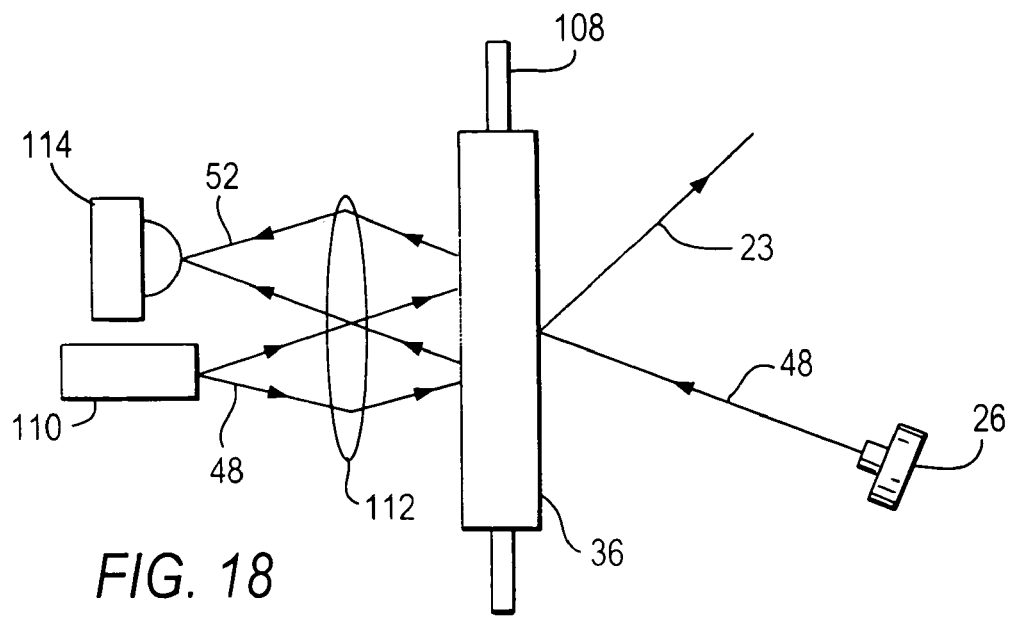
FIG. 18 is a side elevational view of FIG. 17.

FIGS. 17–18 depict still another embodiment of an electro-optical feedback arrangement in which the scan mirror 36 is mounted on shaft 108 for oscillation by a drive. The light source 26 emits the light beam 48 which is reflected off a front surface of the mirror 36 as the scanning beam. Another light source 110 emits another light beam which is focused by lens 112 onto a rear surface of the scan mirror 26 for reflection therefrom through the same lens 112 as feedback beam 52 for detection by another photodetector 114. Whenever the planar mirror 36 is perpendicular to the beam 48, a sharp light pulse is generated by the photodetector. The time between two successive pulses corresponds to one-half of a rotor cycle. As before, the feedback beam 52 can be used as a functional replacement for the feedback signal derived from electromagnetic feedback coils.

It will be understood that each of the elements described above, or two or more together, also may find a useful application in other types of constructions differing from the types described above.

While the invention has been illustrated and described as embodied in a monitoring light beam position in electro-optical readers and image projectors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for determining light beam position, comprising:
   a) a drive for moving a scanning light beam at a scan frequency across a target as a scan line;
   b) means for generating a feedback beam; and
   c) electro-optical feedback means operatively connected to the drive, for optically detecting scan line position during scanning light beam movement, and a position sensitive device for optically detecting position of the feedback beam to generate a feedback signal at said scan frequency, the feedback signal being indicative of the scan line position, and a control circuit for controlling the drive as a function of the feedback signal.

2. The arrangement of claim 1, wherein the drive includes a reflector for reflecting the scanning light beam to the target for reflection therefrom, and a motor for oscillating the reflector in opposite drive directions to generate a raster pattern of scan lines which extend in mutually orthogonal scan directions over the target.

3. The arrangement of claim 2, wherein the target includes one of indicia from which reflected light is electro-optically read, and a screen from which reflected light is viewable.

4. The arrangement of claim 3, wherein the indicia includes one of one-dimensional and two-dimensional bar code symbols.

5. The arrangement of claim 2, wherein the feedback means includes a beam splitter for optically splitting the scanning light beam to form the feedback beam.

6. The arrangement of claim 2, and a main light source for directing a main light beam to the reflector for reflection therefrom as the scanning light beam, and a feedback light source for generating the feedback beam.

7. The arrangement of claim 6, wherein the main light source is a laser, and the feedback light source is a light emitting diode.

8. The arrangement of claim 6, wherein the main and feedback light sources are a laser diode having two apertures.

9. The arrangement of claim 2, wherein the motor has a single coil.

10. The arrangement of claim 2, wherein the target is a screen having frame portions spaced apart along one of the scan directions, each frame portion extending along the other of the scan directions; and wherein the feedback means includes light pipes extending respectively along the frame portions and respectively overlying end positions of each scan line, and a light detector for optically detecting reflections of the scanning light beam incident on the light pipes to generate the feedback signal indicative of the end positions of each scan line.

11. The arrangement of claim 10, and light-absorbing areas spaced apart of one another along each light pipe.

12. The arrangement of claim 1, wherein the target is a screen; and an electrically powered light source for generating a main light beam; and a detector for detecting the screen, and for generating a screen signal indicative of detection of the screen; and a power control circuit for increasing electrical power to the light source as a function of the screen signal.

13. A method of determining light beam position, comprising the steps of:
   a) moving a scanning light beam generated from a main beam across a target at a scan frequency as a scan line; and
   b) optically detecting scan line position, and responsively generating a feedback signal indicative of the scan line position, said feedback signal at said scan frequency being generated by a feedback beam that controls the moving step.

14. The method of claim 13, wherein the optically detecting step is performed by optically splitting the scanning light beam to form the feedback beam.

15. The method of claim 13, and the step of controlling a drive for moving the beam as a function of the feedback signal.

16. The method of claim 13, wherein the optically detecting step is performed by detecting end positions of the scan line.

* * * * *